(12) United States Patent
Hsu

(10) Patent No.: US 8,199,378 B2
(45) Date of Patent: Jun. 12, 2012

(54) DEVICE TO TRANSFER FILM IMAGE INTO DIGITAL DATA

(75) Inventor: Chun Chieh Hsu, Chung Ho (TW)

(73) Assignee: CRS Electronic Co. Ltd., Hsi Chi (TW)

( * ) Notice: Subject to any disclaimer, the term of this patent is extended or adjusted under 35 U.S.C. 154(b) by 1202 days.

(21) Appl. No.: 12/003,398

(22) Filed: Dec. 26, 2007

(65) Prior Publication Data

US 2009/0167852 A1 Jul. 2, 2009

(51) Int. Cl.
*H04N 1/00* (2006.01)
(52) U.S. Cl. ...................... 358/475; 358/487; 348/207.2
(58) Field of Classification Search .................. 358/475, 358/487
See application file for complete search history.

(56) References Cited

U.S. PATENT DOCUMENTS

| 6,046,827 | A * | 4/2000 | Ogoshi et al. ................. 358/487 |
| 6,747,689 | B1 * | 6/2004 | No et al. ..................... 348/207.2 |
| 2003/0197901 | A1 * | 10/2003 | Kurosawa ..................... 358/475 |
| 2009/0167852 | A1 * | 7/2009 | Hsu ................................ 348/96 |
| 2009/0167853 | A1 * | 7/2009 | Hsu ................................ 348/96 |
| 2009/0167854 | A1 * | 7/2009 | Hsu ................................ 348/96 |

* cited by examiner

*Primary Examiner* — Khanh Dinh
(74) *Attorney, Agent, or Firm* — Leong C. Lei

(57) ABSTRACT

A kind of device to transfer film image into digital data includes a body, a frame, a bottom brace and a bottom cover wherein the frame body is assembled to the upper portion of the bottom brace and the while the body is housed in the body then the bottom cover is assembled and sealed below. A camera lens is set above the frame. A back light mechanism is set inside the bottom brace. One long groove each is set to two sides of the body and a film plate clamp is inserted from one side. This film plate clamp can fix the film plate inside and position to the top of the back light mechanism. The camera lens is utilized to access the images of the film and transfer the images into digital data to be sent to another computer for storage. The objects of rapid transfer the images on the film into the digital data for easy modification and permanent storage are thus achieved.

3 Claims, 8 Drawing Sheets

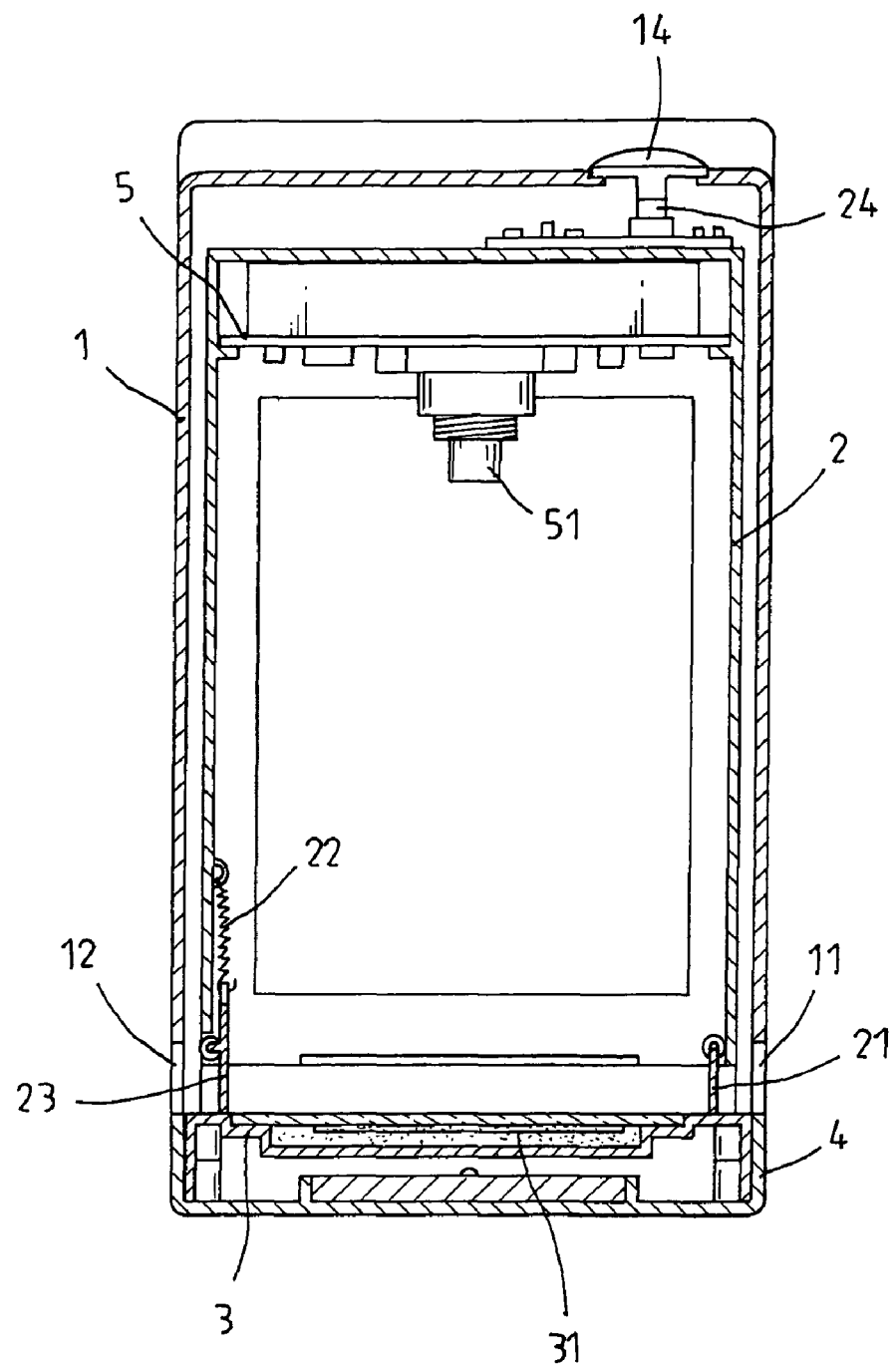
F I G. 3

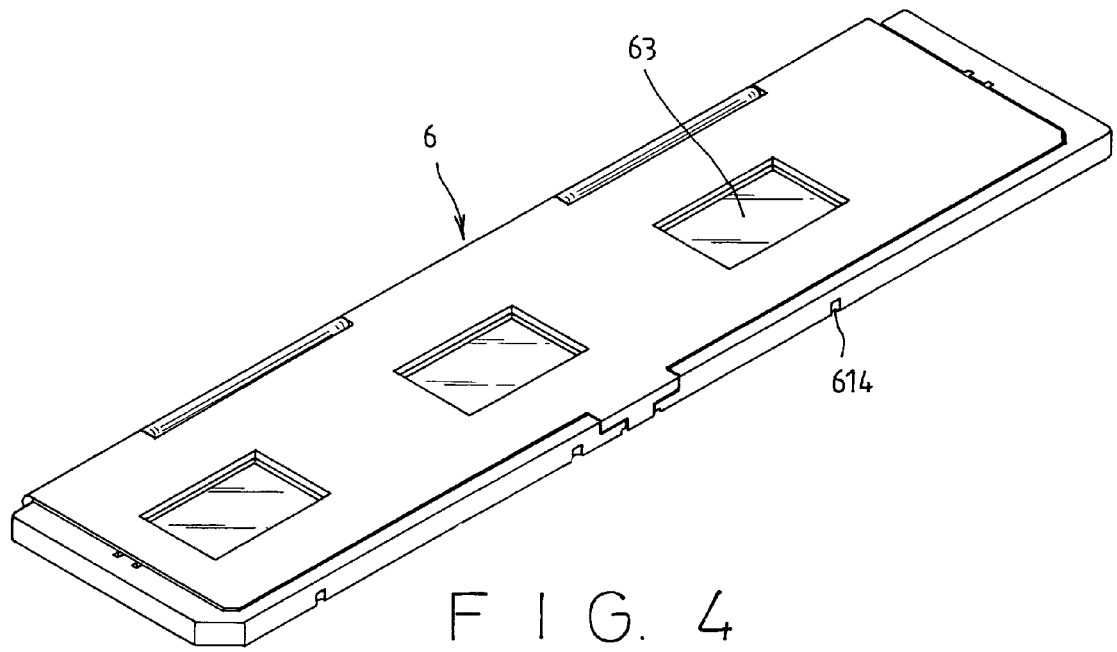
F I G. 4
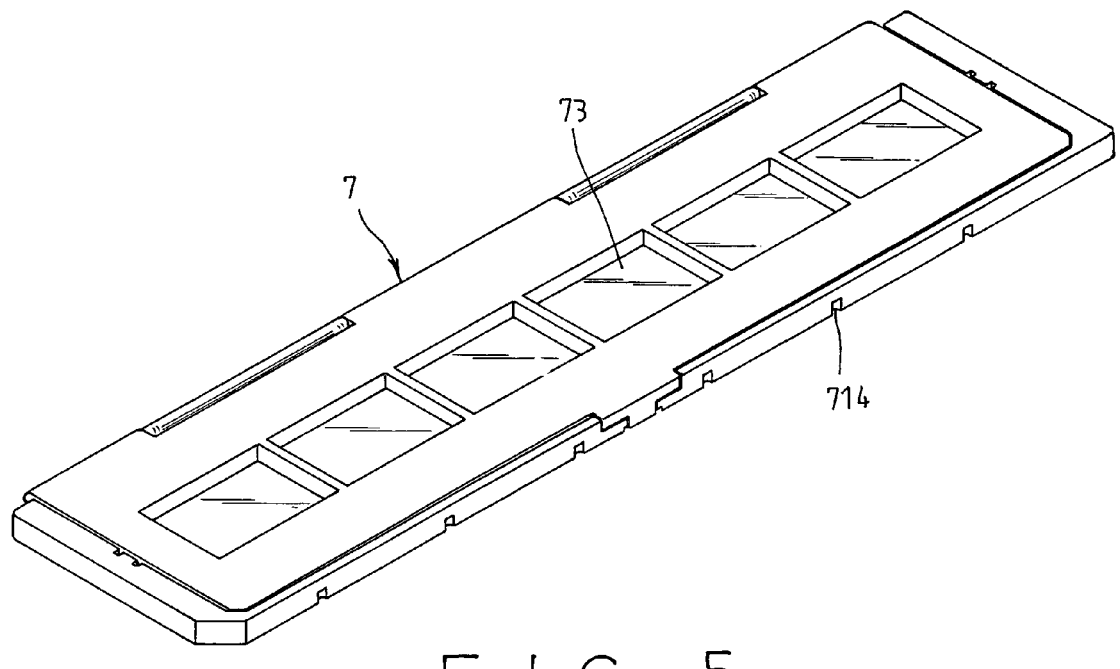
F I G. 5

DEVICE TO TRANSFER FILM IMAGE INTO DIGITAL DATA

FIELD OF THE INVENTION

The present invention is related to a kind of device to transfer film image into digital data. By a single body to fit the camera lens with back light mechanism, the images on the film can be transferred rapidly into the digital data by simple operation then send to the computer that the images can be beneficially stored and modified.

BACKGROUND OF THE INVENTION

The former ways to recording the images are mainly using the traditional camera which is set with light sensitive film (positive or negative film) to get the images. The known photos are thus developed and printed for viewing and enjoyment. The known films are not easy to be stored due to they are made of plastic materials. The images will be lost or damaged after a period of time and the stored images are unable to be developed and printed again. The users are often regretted for that. Furthermore, the images stored in the known films are also fixed status and unable to be modified. This is a disadvantage while usage and needs to be improved.

SUMMARY OF THE INVENTION

Therefore, the main object of the present invention is to provide a transfer device that can transfer the images on the film into digital data quickly. Thus, the images can be stored permanently and can be easily modified in the computer and the known disadvantages are solved. The characteristics and effects of the present invention will be described hereafter by referring to drawings.

BRIEF DESCRIPTION OF THE DRAWINGS

FIG. 3 is a bi-sectional plan drawing of the present invention while assembled.

FIG. 4 is a three-dimensional drawing of the present invention for the film clamp of the positive film.

FIG. 5 is a three-dimensional drawing of the present invention for the film clamp of the negative film.

DETAILED DESCRIPTION OF THE PREFERRED EMBODIMENT

Figure 1:
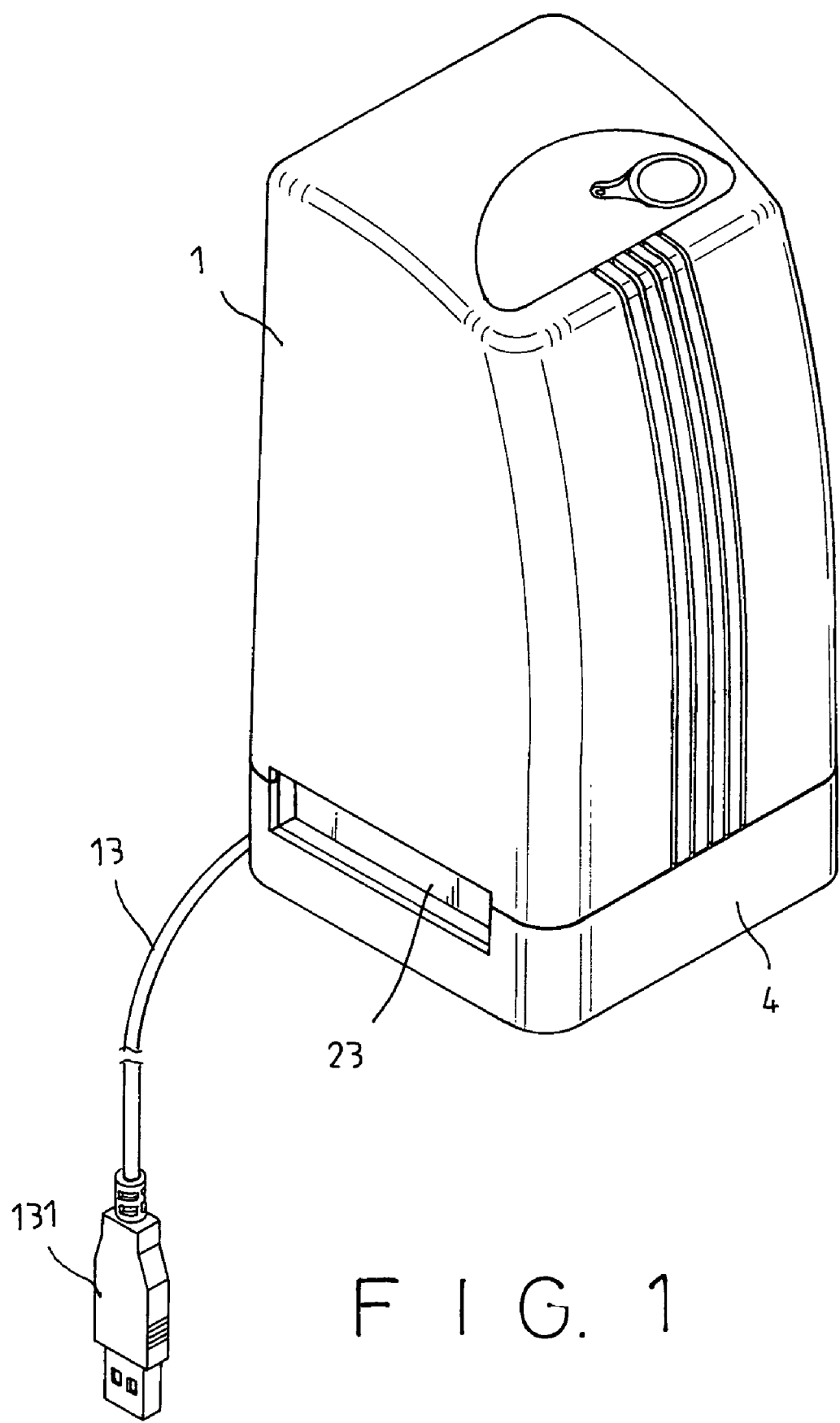
FIG. 1 is a three-dimensional outside appearance drawing of the present invention.
Figure 2:
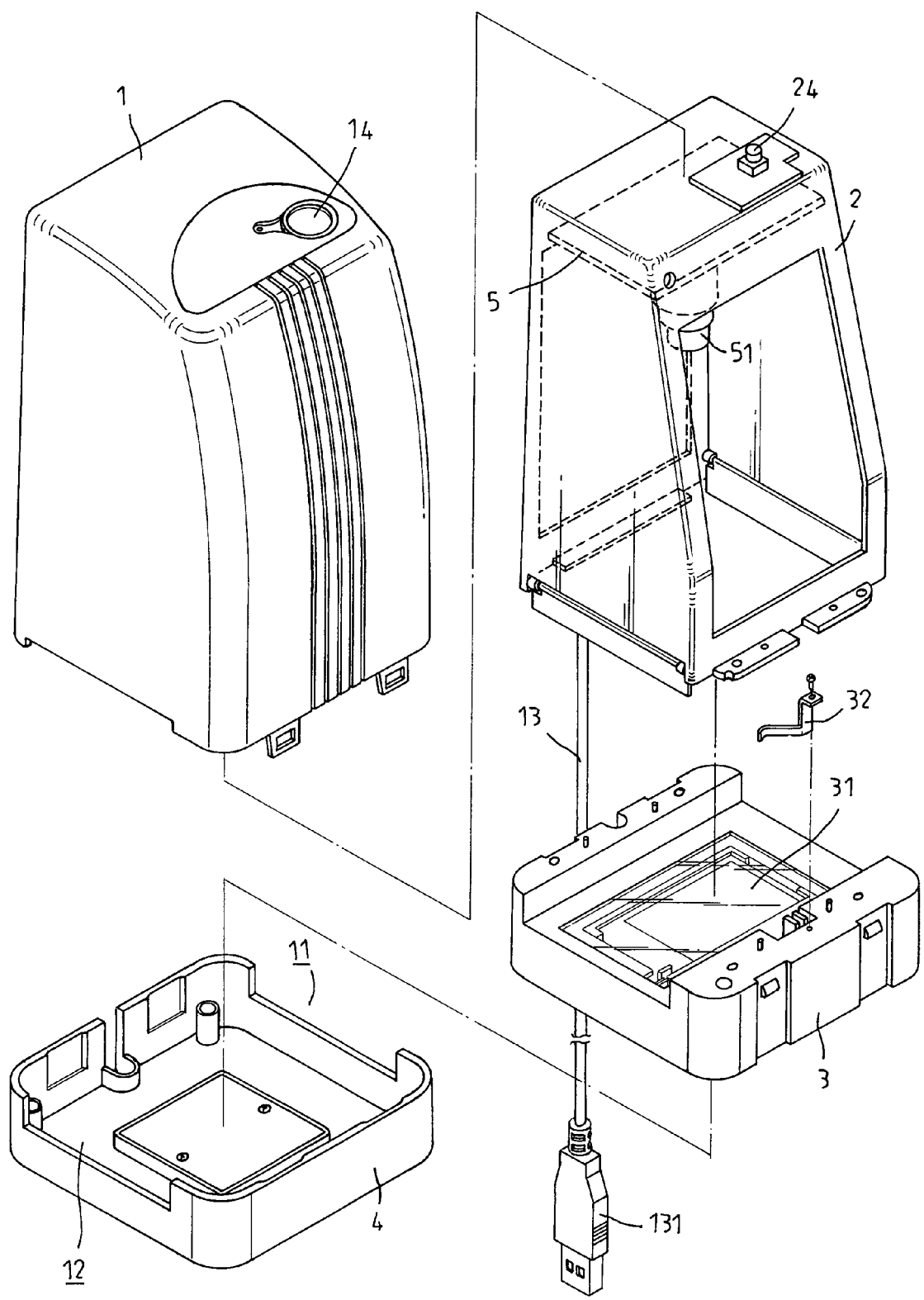
FIG. 2 is a three-dimensional analytic drawing of the present invention.

Please refer to those shown in FIGS. 1~3. The present invention includes a body (1), a frame (2), a bottom brace (3) and a bottom cover (4), wherein the upper portion of frame (2) is set with PCBA (printed circuit board assembly) (5) that a camera lens (51) is assembled in it. The bottom brace (3) is assembled under the frame (2) and a back light mechanism (31) is set inside it. A position wedge (32), a frame (2) and a bottom brace (3) are set at one side then housed inside the body (1), and the bottom cover (4) is assembled and fixed from down under. Two linked long grooves (11), (12) are formed between two sides of body (1) and the bottom cover (4). The inlet dust-proof door (21) which using torsion spring for positioning and the outlet dust-proof door (23) which assembled with tension spring (22) are set at the relative locations inside the frame (2). Furthermore, a connecting cable (13) is used to connect the internal circuit with the computer and transfer the data to computer through the connector (131). A switch (24) can also be set on the frame (2) to accommodate with the button (14) in the upper portion of body (1) to proceed the actions of operation and control.

Figure 6:
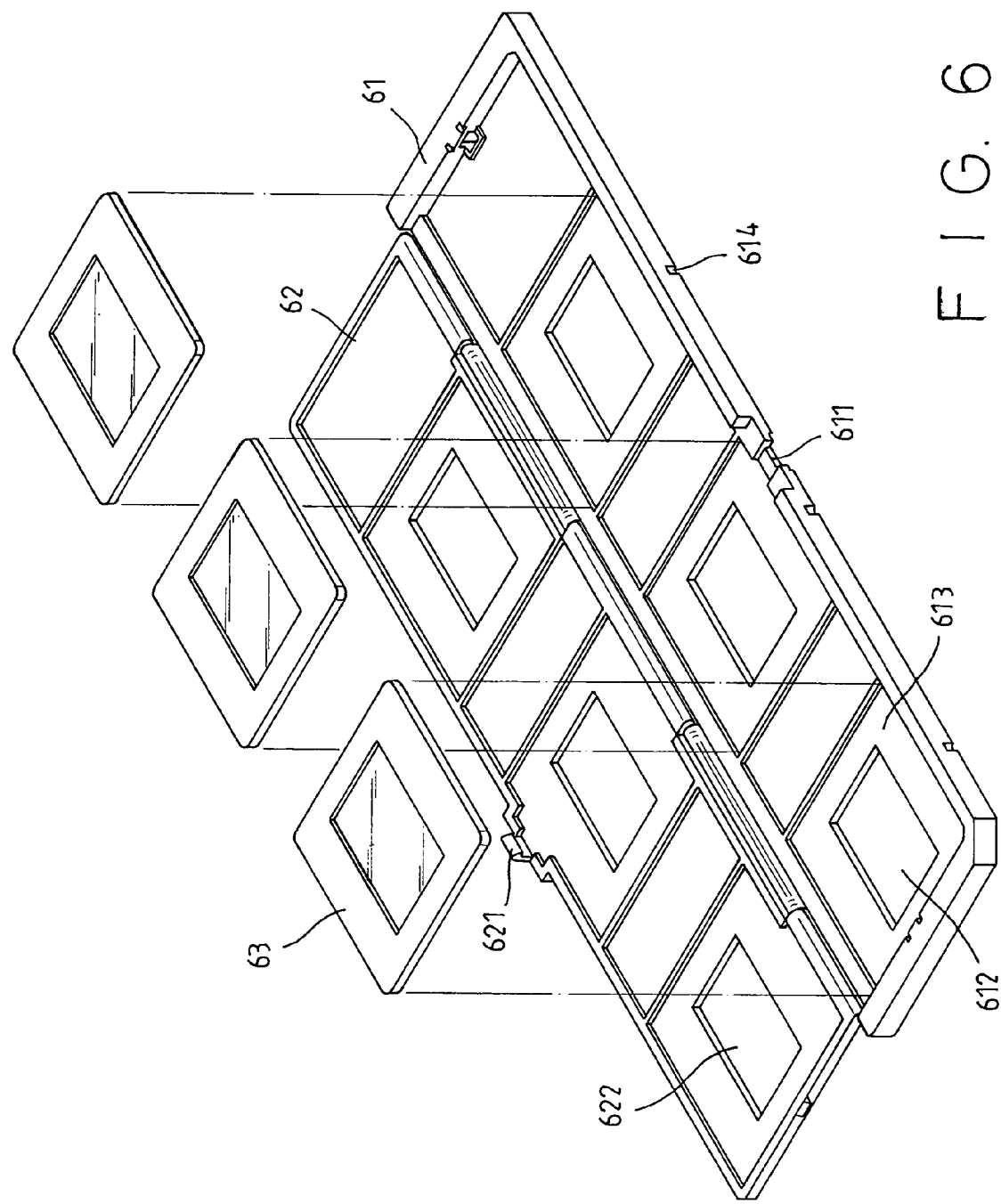
FIG. 6 is a three-dimensional drawing of FIG. 4 after opening.
Figure 7:
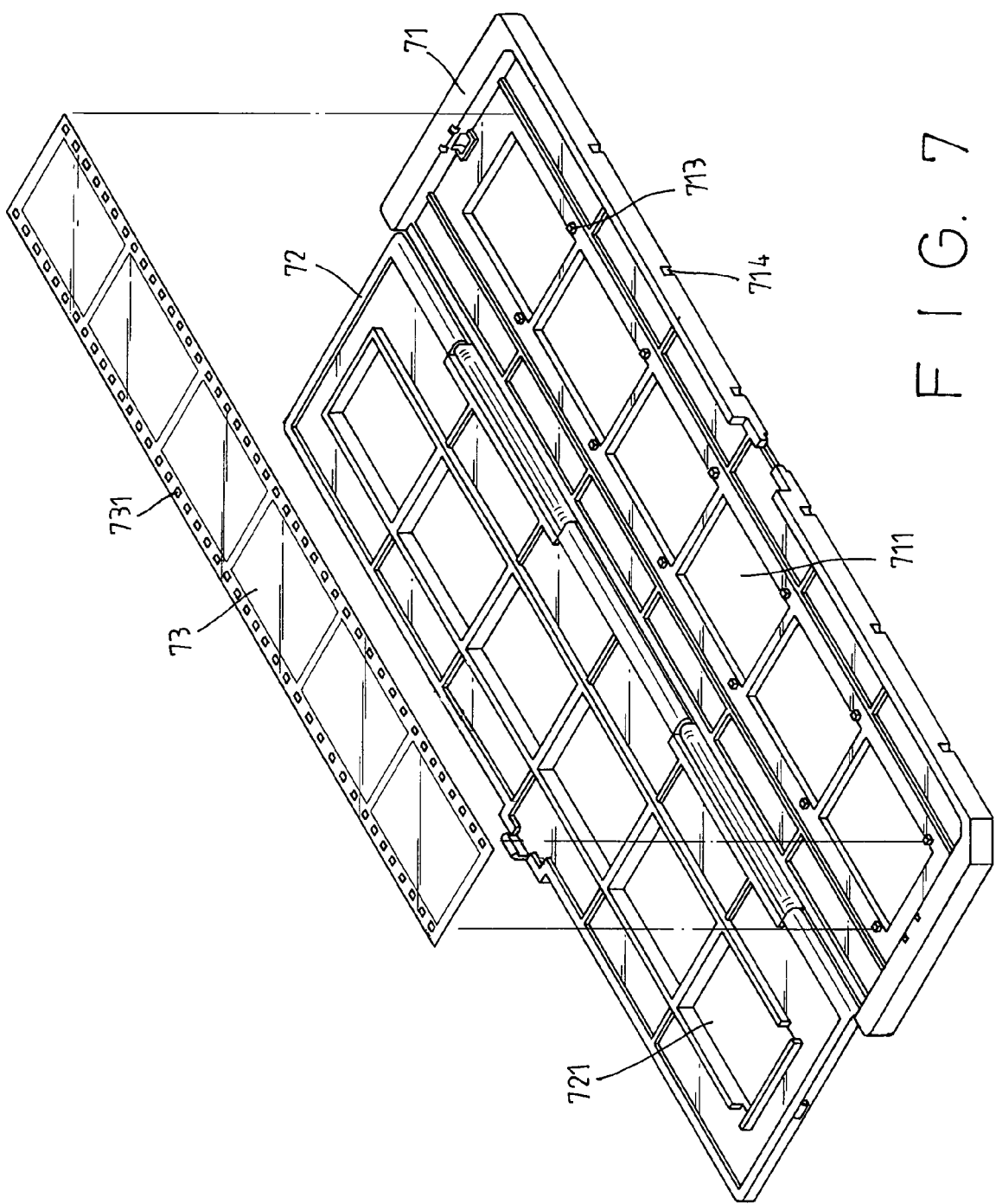
FIG. 7 is a three-dimensional drawing of FIG. 5 after opening.

Please refer to those shown in FIGS. 4 and 6. They are the positive film clamps (6) accommodated and implemented with the present invention which include a lower shell (61) and an upper shell (62) being pivot-linked at one side, and the clip (621) of the upper shell (62) and the clip-assembly portion (611) of the lower shell (61) being accommodated together at the other side to form a simple structure for opening and closing. The lower shell (61) and upper shell (62) each are equipped with several square open holes (612) at the relative positions. Several concaved portions (613) are formed inside the lower shell (61) to put the positive films (63) into them. The upper and lower shells then covered and fixed together to aim the film (63) toward the square open holes (612), (622). Several positioning holes (614) are set at the outside lower rim of lower shell (61). Furthermore, please refer to those shown in FIGS. 5 and 7 again. They are the negative film clamps (7) whose outside structures are similar to those of the positive film clamps (6). Several protrusion rods (713) are set inside the lower shell (71) to provide the clip-assembling with the small holes (731) at two sides of ordinary negative films (73). And, there are more square open holes (721), (711) in upper shell (72) and lower shell (71). Furthermore, several positioning holes (714) are also set at the rim of one side of lower shell (71).

Figure 8:
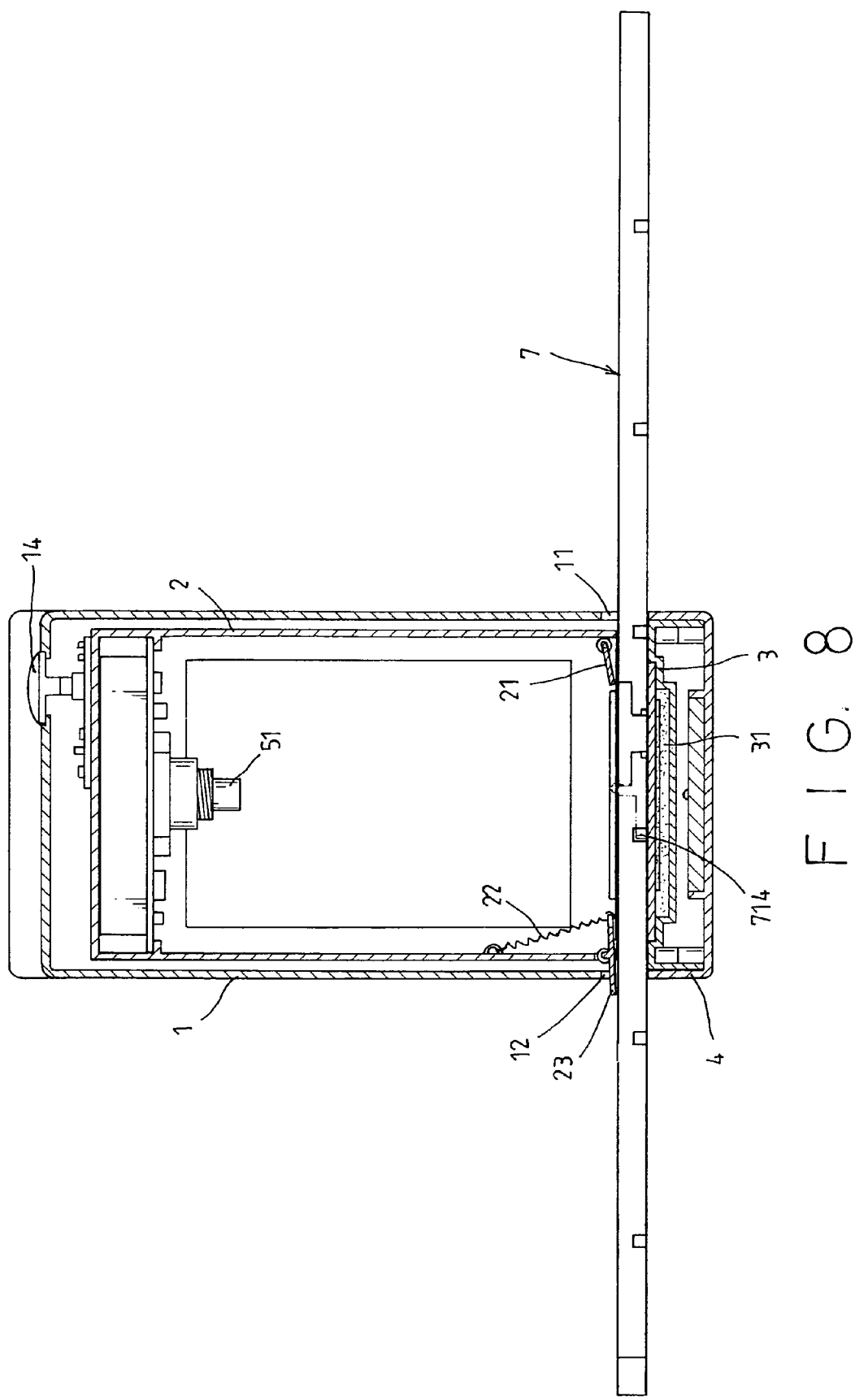
FIG. 8 is a structural status drawing of the present invention while executing the transfer.
Figure 9:
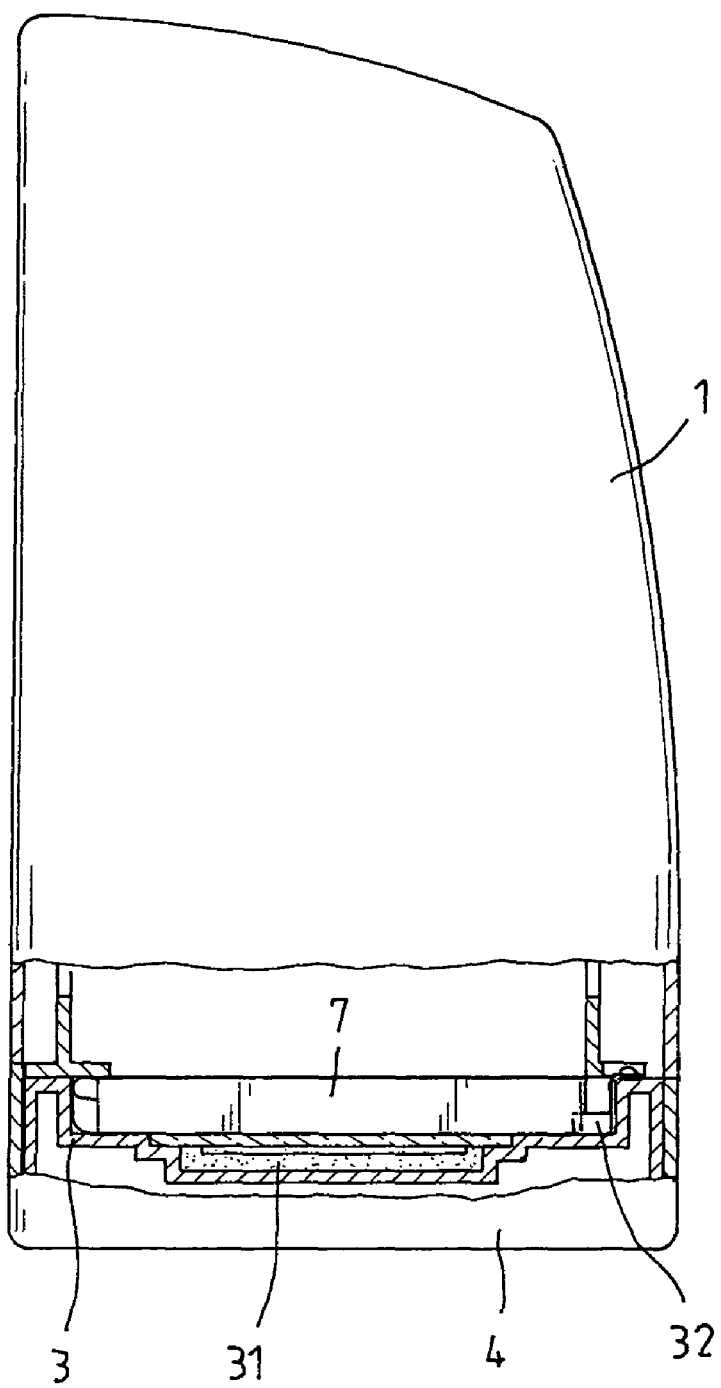
FIG. 9 is a partial bi-sectional drawing of FIG. 8 in another angle.

Using the negative film (73) as an example while usage as shown in FIG. 8, a film clamp (7) clamping with the films is inserted from the long groove (11) of the body (1), and the film in the certain square open hole is aimed to the camera lens (51). The positioning wedge (32) is just snap-fit with a related positioning hole (714) (as shown in FIG. 9) to obtain a secure positioning. Then, the back light mechanism (31) can be activated to emit the light and project to the film by the control from computer through connecting cable (13) or direct pressing the buttons (14). And, the images taken from the camera lens (51) is processed by programs and transferred into digital data then send to computer for modification or direct storage. Afterward, the film clamp (7) can be pushed toward the outlet end again to proceed the access of images for the next film.

While the films of the same film clamp have been accessed and transferred completely, the film clamp can be removed from the long groove end (12) of the outlet of that film clamp. By continuing the aforementioned operations, the films inside can be replaced again and all operations can be completed quickly. For positive films, the ways of operations are all the same and very easy.

Therefore, the present invention obviously can transfer quickly and easily the positive films and negative films into digital data to provide the possible modification and direct storage once again. Thus, the present invention is rich of practicality and conforms to the conditions of patent, and the application is filed according the law.

I claim:

1. A device to transfer film image into digital data comprising:
- a body having a bottom, said bottom having two opposite sides each formed with a groove;
- a frame having an upper portion provided with a printed circuit board assembly, said frame having an inlet door pivotally mounted at one side of a bottom of said frame and an outlet door pivotally mounted at an opposite side of said bottom of said frame;
- a camera lens mounted in said printed circuit board assembly;
- a bottom brace assembled under said frame and having a recess, said recess having an end closed by said inlet door and an opposite end closed by said outlet door;
- a back light mechanism set inside said bottom brace;
- a positioning wedge set at one side of said bottom brace and housed inside said frame; and
- a bottom cover having a top, said top two opposite sides each having a groove, said bottom cover being engaged with said bottom of said body with said groove of said bottom cover aligned with said groove of said body thereby providing a passage extending through said recess of said bottom brace, said groove of said bottom cover and said groove of said body;
- a connector connecting said printed circuit board assembly via a connecting cable;
- a film clamp insertable through said openings of said body and said bottom cover and said recess of said bottom brace, said film clamp having a lower shell and an upper shell pivotally connected with said lower shell, said lower shell and said upper shell having a plurality of square open holes, said lower shell having an outside lower rim provided with a plurality of positioning holes adapted to be engaged with said positioning wedge for obtaining a secure positioning;
- wherein when said film clamp is inserted into said passage, a film fitted in one of said square open holes is aimed to said camera lens, said back light mechanism is activated to emit light and project to said film and images taken from said camera lens are processed by programs and transferred into digital data which are then sent to a computer for modification or storage.

2. The device to transfer film image into digital data as claimed in claim 1, wherein said square open holes are formed in a concave portion for receiving a positive film.

3. The device to transfer film image into digital data as claimed in claim 1, wherein said lower shell is provided with a plurality of protrusion rods for engaging with holes of a negative film.

* * * * *